Oct. 8, 1946.　　　　　H. L. STEINER　　　　2,408,891
CUTTER
Filed March 9, 1944
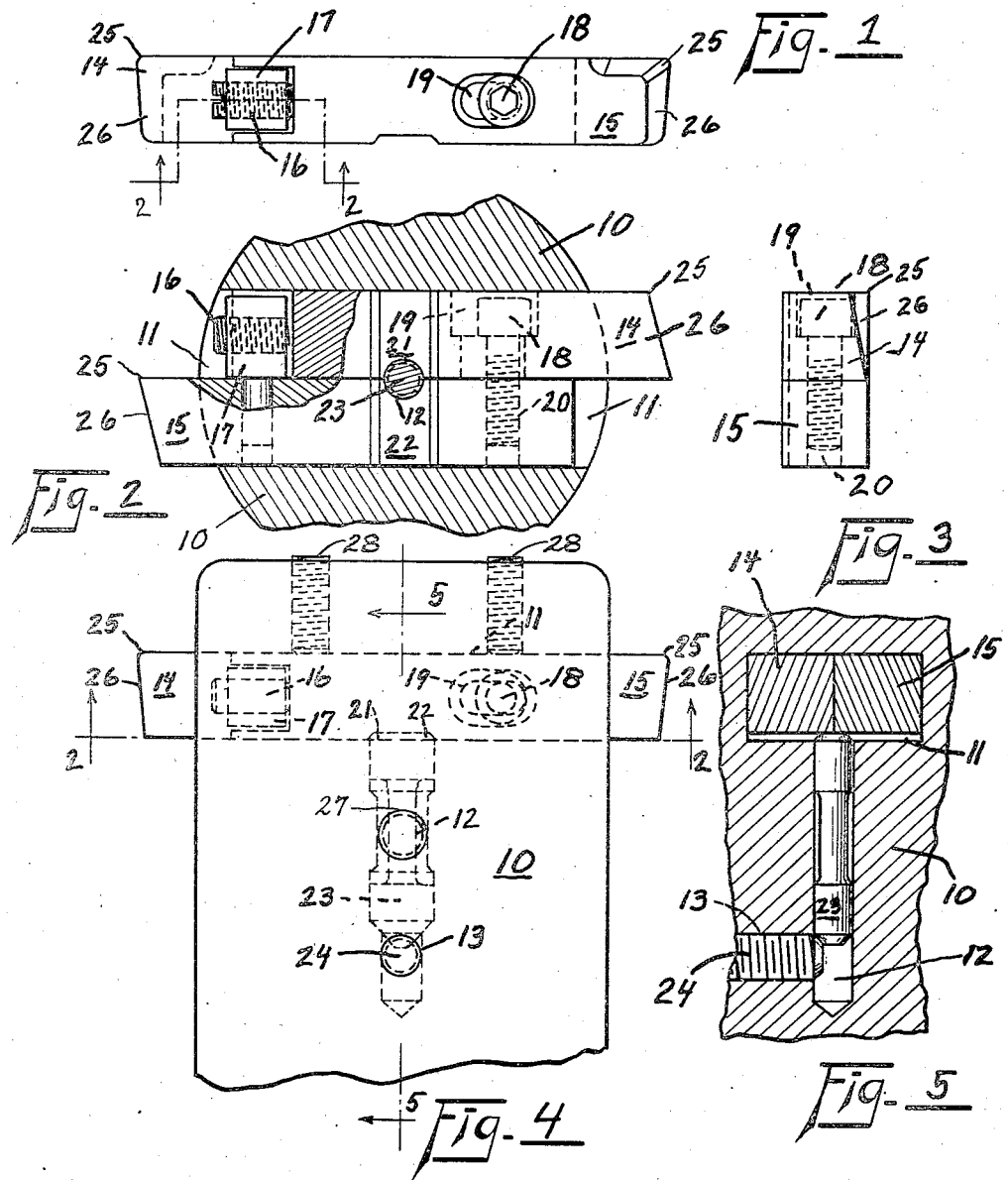
Witness:
Geo L. Chapel
Inventor
Herman L. Steiner
By Ries and Ries
Attorneys Patented Oct. 8, 1946

2,408,891

UNITED STATES PATENT OFFICE 2,408,891

CUTTER

Herman L. Steiner, Muskegon, Mich., assignor to Madison Manufacturing Company, Muskegon, Mich.

Application March 9, 1944, Serial No. 525,653

2 Claims. (Cl. 77—58)

The present invention relates to cutters and more particularly to an adjustable boring cutter and cutter securing bar designed for use in and with an automatic or turret lathe, drill press, engine lathe, milling machine, boring mill or other machine designed to produce round holes in metals or plastics.

The primary objects of the instant invention are to provide a device of the general character above indicated whose cutter is provided with a pair of interrelatively and parallelly movably adjustable cutter blades; to provide such a cutter whose several blades each automatically cut a predetermined size bore during each half revolution of the cutter securing bar; to provide such a device whereby boring time of the cutter is considerably reduced since each blade of the cutter carries but half of the cutting load; to provide such a device whose cutter blades are automatically centered in the cutter securing bar whereby the cutter will bore to the size set and the cutter is automatically centered with respect to the hole to be bored; to provide such a device whose cutter blades cut on either or both the front and side edges and a finish may be assured by the use of the side cutting edges of each blade; to provide such a device whose cutter blades may be reground and set to any size within their adjusting range; to provide such a device whose cutter blades will not bore over or under size after adjustment; to provide such a device which may be used to true out-of-round bores; to provide such a device which eliminates all sizing and adjusting required in instances wherein a single point tool is employed; and, to provide such a device which may be readily and conveniently adjusted, is highly efficient in use and which is reasonably economical in manufacture.

An illustrative embodiment of the invention is shown in the accompanying drawing, wherein:

Figure 1 is a top elevational view of the dual cutter blades of the cutter;

Figure 2 is a sectional view of the cutter and the cutter securing bar on line 2—2 of Figure 4 with an additional section on line 2—2 of Figure 1;

Figure 3 is an end elevational view of the cutter blades of the cutter viewed from the right as seen in Figure 2;

Figure 4 is a fragmentary elevational view of the cutter and its cutter securing bar; and Figure 5 is a sectional view on line 5—5 of Figure 4.

Referring then to the drawing wherein like parts of the device shown are designated by the same numerals in the several views, an elongated cutter securing bar 10, here shown as cylindrical in form and adapted for use in and with an automatic or turret lathe, drill press, engine lathe, milling machine, boring mill or other machine designed to produce round holes in metals or plastics, is provided with a transverse slot 11 and with an axially disposed well 12 communicating therewith running inwardly whose inner end is in communication with a transversely disposed screw-threaded bore 13 running to the outer perimeter of the cylindrical cutter supporting bar 10, all as best shown in Figures 2, 4 and 5.

A pair of cutter blades 14, 15 forming the cutter, disposed within the slot 11 of the cutter securing bar 10, are interrelatively and parallelly movable one above the other prior to their adjustment as to the diameter of the bore to be cut. The predetermined adjustment of these blades is initially fixed by means of the adjusting screw 16 within the screw threaded bore of the head 17 of the blade 15, the inner end of which set engages the inner end of the blade 14 and which predetermined setting is ultimately fixed by tightening the locking screw 18 whose head is disposed within the elongated screw head well 19 of the blade 14 and whose shank is in engagement with the screw threaded bore 20 of the blade 15.

The blades 14, 15 of the cutter are each provided on their adjacent lengths with a registering but interrelatively shiftable transverse groove 21, 22 respectively and a pin 23 within the axially disposed well 12 engages at one end thereof medially and adjacently said grooves, irrespective of the predetermined diameter setting of the blades 14, 15, when the set screw 24 within the screw threaded bore 13 is tightly drawn against the other end of the pin 23 and locked by tightly drawing set screw 27.

The cutting edges of both blades 14, 15 are on both the front edges 25 and side edges 26, thus permitting each blade to be re-ground whereby any size within its adjustable range may be maintained.

In use, the predetermined diameter of the hole to be bored or the out-of-round hole to be trued is initially fixed by first adjusting the interrelatively and parallelly movable blades 14, 15 of the cutter by means of adjusting screw 16 within the screw threaded bore of the head 17 of the blade 15, the inner end of which set screw engages the inner end of the blade 14 and thereby determines the "closed" diameter of the several blades of the cutter.

This "closed" diameter or predetermined setting of the blades 14, 15 is fixed by tightening the set screw 18 whose head is disposed within the elongated screw head well 19 of the blade 14 and whose shank is in engagement with the screw threaded bore 20 of the blade 15.

Since the well 12 of the cutter securing bar 10 is axially disposed and since the head of the pin 23 therein engages the transverse grooves 21, 22 of the blades 14, 15 medially thereof irrespective of the predetermined setting of said blades when the set screw 24 within the screw threaded bore 13 is tightly drawn against the other end of the pin 23, each blade automatically cuts the predetermined feed size during each half revolution of the cutter securing bar 10 and each blade 14, 15 carries but half of the cutting load, whereby boring time is considerably reduced. The cutter blades 14 and 15 which are slidable longitudinally on each other may be adjusted in either direction to expand or contract the cutter and irrespective of the relative position of both blades the pin will engage the converging side walls of the transverse slots and automatically center the blades and initially clamp the blades in the transverse opening of the boring bar when the said pin is actuated by the screw 24. After the blades have been centered and initially clamped in the transverse slot of the boring bar, they are securely locked by lock screws 28 which are threaded into the end of the boring bar and which extend inwardly therefrom to the transverse slot, as clearly illustrated in Fig. 4 of the drawing.

It will thus be seen that the device herein shown and described may be readily and conveniently adjusted, is highly efficient in use and is reasonably economical in manufacture and while but one specific embodiment of the invention has been herein shown and described, it will be understood that certain details of the construction shown may be altered or omitted without departing from the spirit of the invention as the same is defined by the following claims.

I claim:

1. A boring tool comprising a boring bar having a transverse cutter receiving slot and provided with an axially disposed well communicating at one end with the slot, a pair of cutter blades arranged side by side in said slot and interrelatively and parallelly slidable on each other throughout the major portions of their length and provided at their outer ends with cutting edges, said blades being provided intermediate of their ends with centrally arranged registering transverse grooves each having converging side walls, adjusting means disposed between the blades for determining the diameter of the bore to be cut, means carried by the blades for fixing said predetermined bore, a pin disposed in the well of the boring bar and arranged to engage simultaneously the converging walls of the transverse grooves for centering the blades with respect to the boring bar, and means for engaging and forcing the pin outwardly to effect the centering of the blades and the clamping of the same within the transverse slot of the bar.

2. A boring tool comprising a boring bar having a transverse cutter receiving slot and provided with an axially disposed well communicating at one end with the slot, said bar being provided with a threaded transverse bore extending inwardly from one side of the boring bar and terminating at its inner end at the said well, a pair of cutter blades arranged side by side in said slot and interrelatively and parallelly slidable on each other throughout the major portions of their length and provided at their outer ends with cutting edges, said blades being provided intermediate of their ends with centrally arranged registering transverse grooves each having converging side walls, adjusting means disposed between the blades for determining the diameter of the bore to be cut, means carried by the blades for fixing said predetermined bore, a pin disposed in the well of the boring bar and arranged to engage simultaneously the converging walls of the transverse grooves for centering the blades with respect to the boring bar, and a screw arranged within the threaded transverse bore of the boring bar and having a tapered inner end engaging said pin for forcing the same outwardly to effect the centering of the blades and a clamping of the same within the transverse slot of said bar.

HERMAN L. STEINER.